| United States Patent [19] | [11] Patent Number: 4,738,776 |
| Brown | [45] Date of Patent: Apr. 19, 1988 |

[54] LUBRICANT FILTER ASSEMBLY

[75] Inventor: Gene W. Brown, Cookeville, Tenn.

[73] Assignee: Cummins Engine Company, Inc., Columbus, Ind.

[21] Appl. No.: 866,871

[22] Filed: May 23, 1986

[51] Int. Cl.⁴ .................... B01D 29/26; F01M 11/03
[52] U.S. Cl. ............................ 210/168; 210/314; 210/DIG. 13; 210/DIG. 17
[58] Field of Search .................. 210/168, 416.5, 314, 210/316, 323.2, 345, DIG. 13, DIG. 17; 123/196 A

[56] References Cited

U.S. PATENT DOCUMENTS

| 2,748,949 | 6/1956 | James | 210/DIG. 13 |
| 2,995,253 | 8/1961 | Belgarde et al. | 210/323.2 |
| 3,586,171 | 6/1971 | Offer | 210/314 |
| 4,151,823 | 5/1979 | Grosse et al. | 210/168 |

FOREIGN PATENT DOCUMENTS

| 2840117 | 4/1979 | Fed. Rep. of Germany | 210/168 |
| 1103138 | 10/1955 | France | 210/DIG. 13 |
| 1604832 | 12/1981 | United Kingdom | 210/314 |
| 1604834 | 12/1981 | United Kingdom | 210/314 |
| 1604833 | 12/1981 | United Kingdom | 210/314 |

Primary Examiner—Richard V. Fisher
Assistant Examiner—Richard D. Jordan
Attorney, Agent, or Firm—Neuman, Williams, Anderson & Olsen

[57] ABSTRACT

A lubricant filter assembly for an internal combustion engine is provided which includes a head member removably mounted on a base member. The head member includes a sleeve-like housing open at one end only and having first and second filter units fixedly mounted therein. The outer peripheries of the filter units coact with the interior surface of the housing to form a common inlet passage. One of the filter units is provided with an interior first outlet passage which communicates with a first passage formation formed in the base member. The first passage formation communicates with a first lubricating circuit of the engine. The second filter unit is provided with an interior second outlet passage which communicates with a second passage formation formed in the base member. The second passage formation communicates with a second lubricating circuit of the engine. Seal sections are carried by the head member. One seal section effects a sealing engagement between the base member and a portion of the housing defining the open end. A second seal section is disposed within the housing and prevents direct communication between the inlet passage and the first outlet passage. A third seal section is disposed within the housing and prevents communication between the first and second outlet passages. The sealing engagement effected by the third seal section is enhanced upon the flow pressure within the interior first outlet passage being increased.

4 Claims, 3 Drawing Sheets

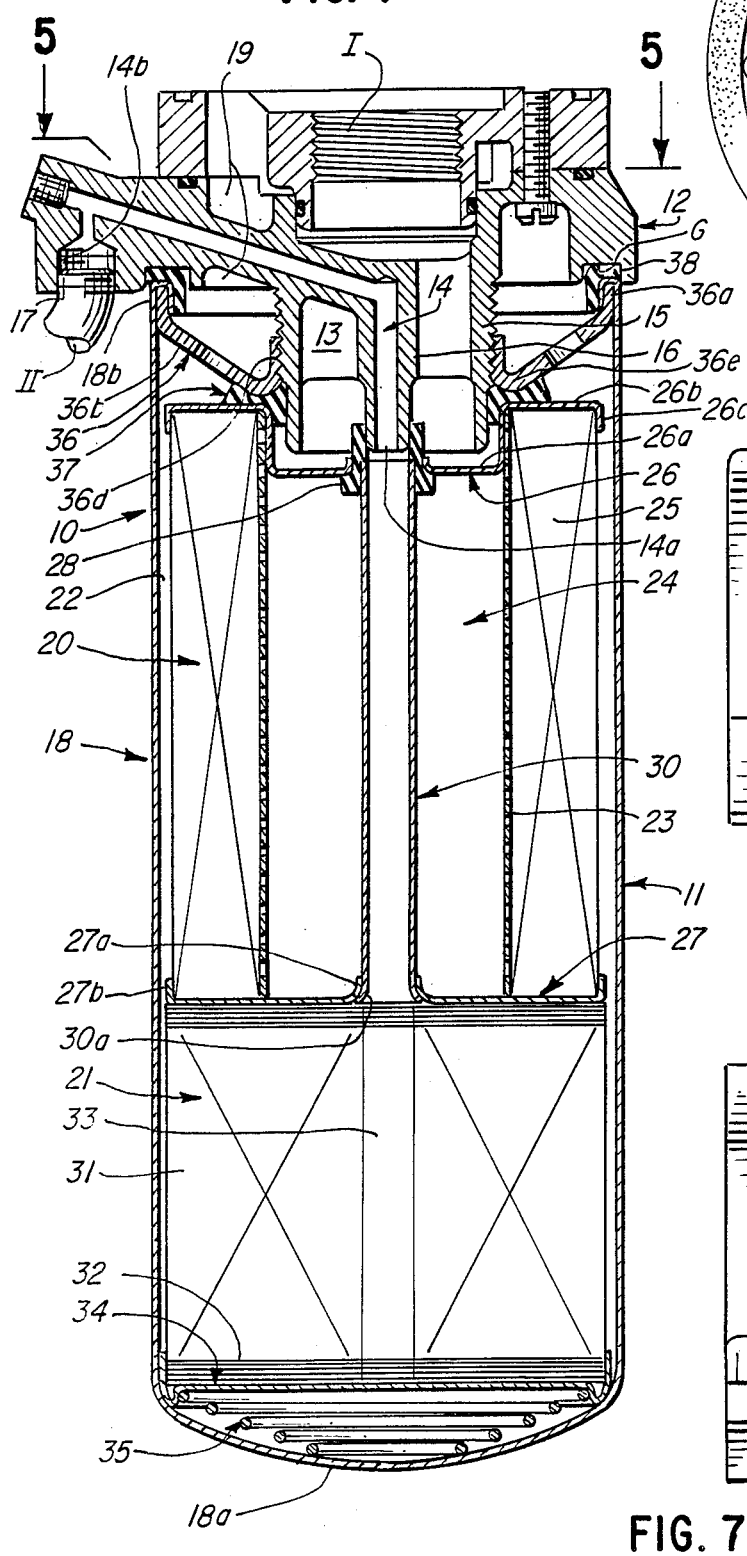
FIG. 1
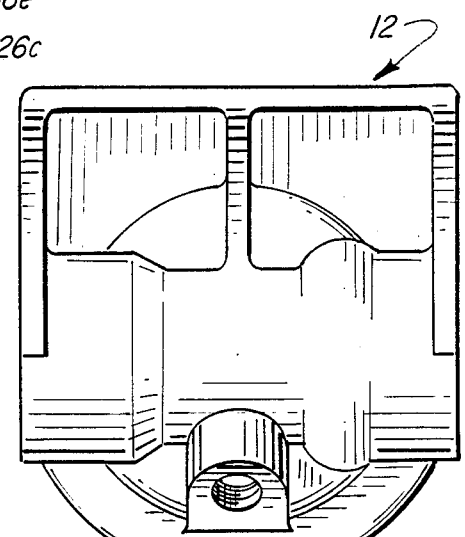
FIG. 5
FIG. 6
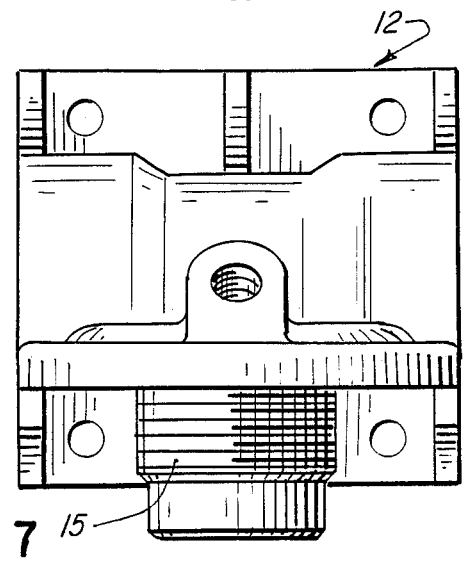
FIG. 7

U.S. Patent   Apr. 19, 1988   Sheet 3 of 3   4,738,776
FIG. 4
FIG. 3
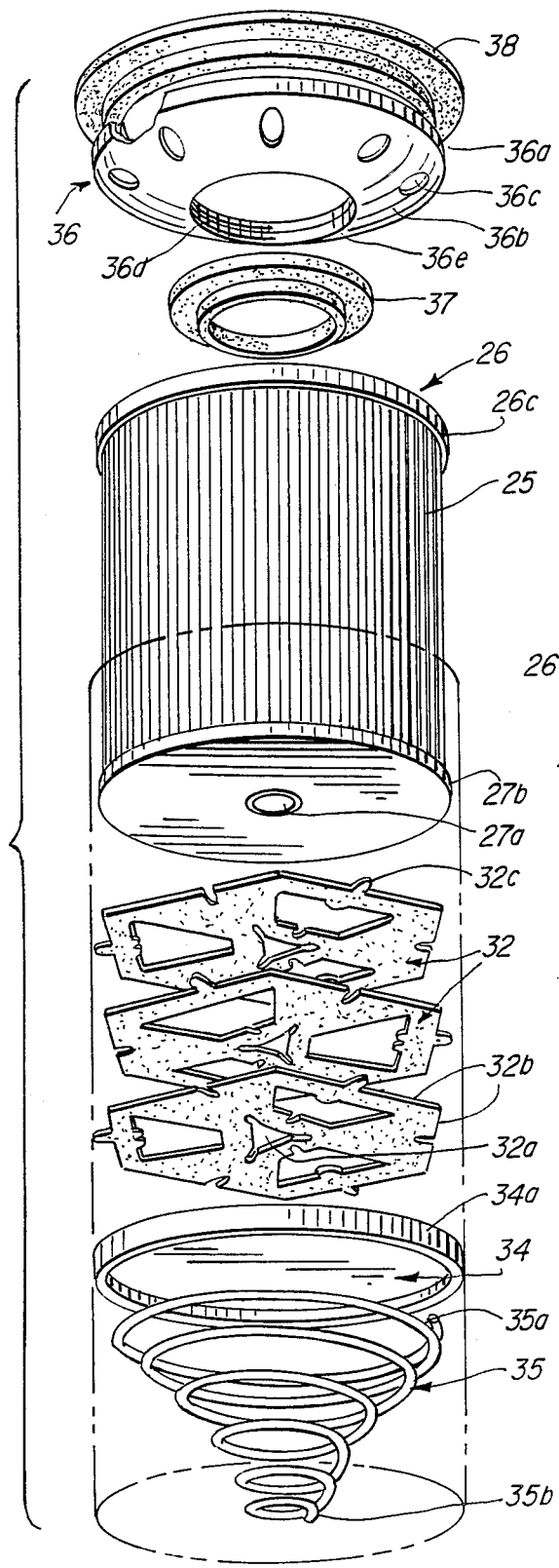
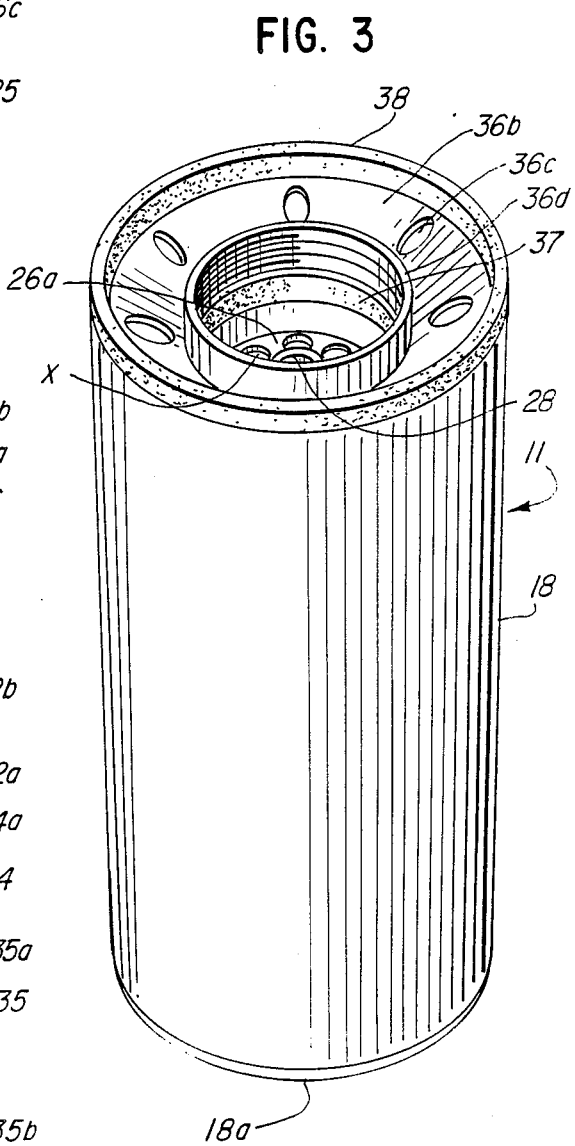

LUBRICANT FILTER ASSEMBLY

BACKGROUND OF THE INVENTION

Various lubricant filter assemblies have heretofore been utilized on heavy duty diesel engines and the like which have the capability of simultaneously filtering the lubricant flowing through two different lubricating circuits within the engine. Such assemblies, however, because of their structural design are possessed of one or more of the following shortcomings: (a) the assembly occupies an inordinate amount of space when installed on the engine or when stored for inventory; (b) the replacement of the filter units requires an awkward manual manipulation and an inordinate amount of effort; (c) the assembly is susceptible to leakage; and (d) assembly incorporates a substantial number of component parts.

SUMMARY OF THE INVENTION

It is an object of the invention to provide an improved filter assembly which is not beset with any of the aforementioned shortcomings.

It is a further object to provide an improved filter assembly wherein the filter units thereof have high contaminant capacities.

It is a further object to provide an improved filter assembly which requires a low amount of torque to be applied to the head member in order to properly install same on the base member.

It is a still further object to provide an improved filter assembly possessed of a superior proof pressure capability notwithstanding the low torque applied to properly install the head member on the base member.

Further and additional objects will appear from the description, accompanying drawings, and appended claims.

In accordance with one embodiment of the invention a lubricant filter assembly is provided for use on an internal combustion engine. The filter assembly includes a head member which is removably mounted on a base member, the latter having formed therein a first passage formation in communication with a first lubricating circuit formed in the engine, and a second passage formation in communication with a second lubricating circuit formed in the engine. The head member includes an elongated housing open at only one end and a pair of filter units fixedly mounted within the housing. Outer peripheral portions of the filter units coact with an interior surface of the housing to form a common inlet passage. One filter unit is provided with an interior first outlet passage which communicates with the first passage formation of the base member. The other filter unit is provided with an interior second outlet passage which is independent of the first outlet passage and communicates with the base member second passage formation. A plurality of seal sections are carried on the head member. One seal section effects a sealing engagement between the base member and the portion of the housing defining the open end. A second seal section is disposed within the housing and prevents direct communication between the inlet passage and the first outlet passage. A third seal section is disposed within the housing and effects separation between the first and second outlet passages.

BRIEF DESCRIPTION OF THE DRAWINGS

For a more complete understanding of the invention, reference is made to the drawings, wherein:

FIG. 1 is an enlarged, fragmentary, vertical sectional view of one embodiment of the improved filter assembly.

FIG. 3 is a perspective side view of the head member removed from the base member.

FIG. 4 is a perspective side view of the various components disposed within the sleeve-like housing of the head member; said components being shown in exploded relation.

FIG. 5 is a top plan view of the open end of the head member.

FIGS. 6 and 7 are top and side views, respectively, of one form of a base member.

DESCRIPTION OF THE PREFERRED EMBODIMENTS

Figure 2:
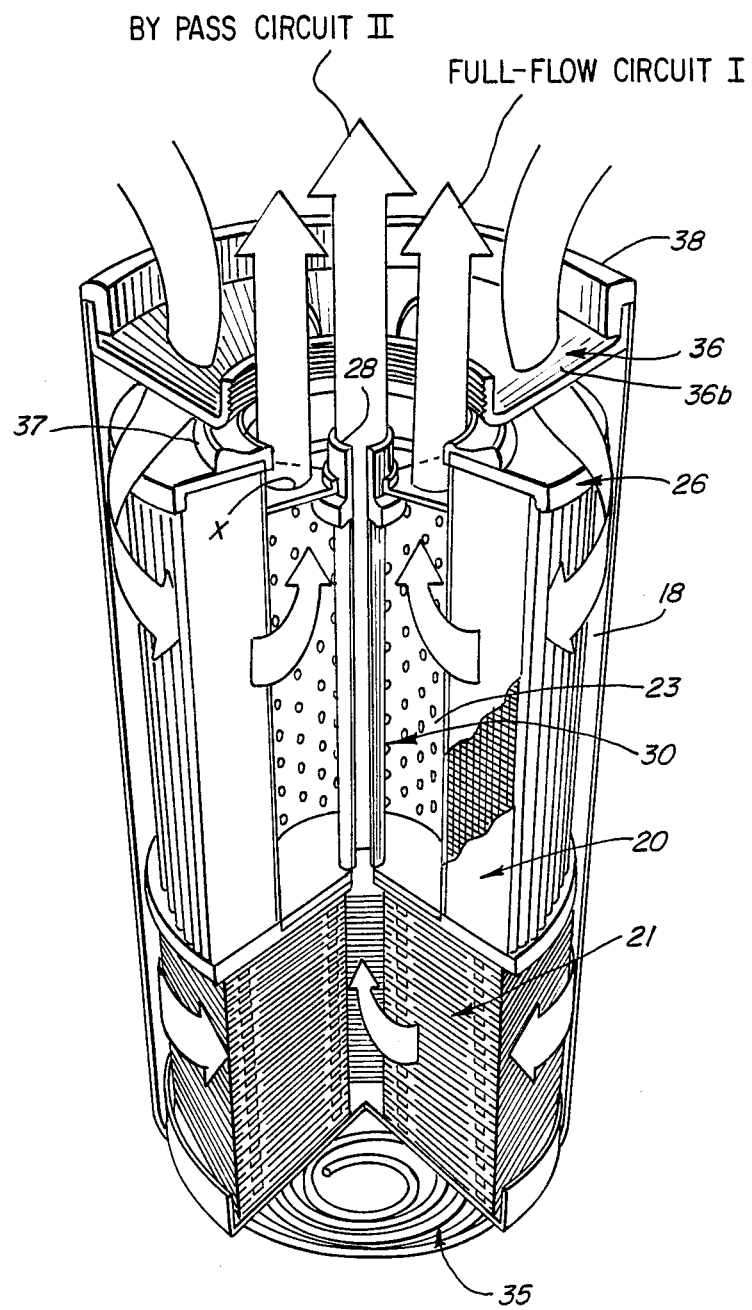
FIG. 2 is a fragmentary perspective side view of the head member shown in FIG. 1 with a portion removed to expose the interior thereof and showing paths of the lubricant flow therethrough.

Referring now to the drawings and more particularly to FIG. 1, one embodiment of the improved lubricant filter assembly 10 is shown which is capable of providing simultaneous filtering of the lubricant flowing through two separate lubricating circuits formed within an internal combustion engine. The first lubricating circuit I, (sometimes referred to as the high flow circuit), of the engine normally includes a conventional oil pump, various bearings and related parts, all of which are not shown. The second lubricating circuit II, (sometimes referred to as the by-pass circuit) of the engine normally includes a sump, also not shown.

In the illustrated embodiment, the improved filter assembly comprises a head member 11 which is removably mounted on a base member 12. The base member is provided with an interior first passage formation 13 which communicates with lubricating circuit I of the engine. The base member is also provided with an interior second passage formation 14, the latter being a part of the engine second lubricating circuit II. As seen in FIGS. 1 and 7 the first passage formation 13 is defined in part by an externally threaded, depending, cylindrical collar 15. Disposed within the collar 15 is a pipe-like protuberance 16 which defines an entry 14a for the second passage formation 14. The opposite or outlet end 14b of the passage formation 14 may be internally threaded to accommodate a connector piece 17 which forms a part of the second lubricating circuit II. The shape, size and relative location of the first and second passage formations formed in the base member 12 may vary from that shown.

As shown in the drawings, the removable head member depends from the base member. However, if desired the base member and head member may be inverted from that shown so that the head member extends upwardly from the base member. Depending upon the location of the filter assembly on the engine, the head member 12 may assume various other angular positions.

The head member 11 includes an elongated sleeve-like housing 18 of cylindrical configuration. The lower end 18a of the housing is closed and the opposite end 18b is open. Fixedly mounted within the housing are two or more filter units 20, 21 which are arranged in aligned endwise relation. Both units have outer peripheries of like configurations (e.g., cylindrical, hexagonal etc.) which are in spaced relation with respect to the interior surface of the housing thereby forming a common inlet passage 22, which completely encompasses both filter units. The upper end of inlet passage 22 communicates with a passage 19 formed in base member 12, which communicates with a lubricant pump, not shown, incorporated in the engine. The first, or upper, filter unit 20—that is the one closest to the housing open end 18b—includes a porous or perforated tube 23 which is disposed coaxially with the longitudinal axis of the housing 18. The tube defines the first outlet passage 24. Encompassing the exterior of the tube is a filter medium 25, which may be a conventional micro-glass full flow material, triple laminated and wire backed so as to permit a relatively high lubricant flow therethrough. The grade of filtration of the medium 25 would normally be considered medium coarse.

The upper and lower end portions of the tube 23 and filter medium 25 are engaged respectively, by upper and lower end pieces 26, 27. Upper end piece 26 is provided with an apertured, recessed center portion 26a, see FIG. 5, which is sized so as to snugly fit within the upper end of tube 23, see FIG. 1. The apertures X formed in the center portion 26a effect communication between the first outlet passage 24 and the first passage formation 13 of the base member 12. Extending radially outwardly from the recessed center portion is planar impervious intermediate portion 26b which is sized so as to overlie the upper end of filter medium 25. The outer periphery of intermediate portion 26b terminates in a depending flange or rim 26c. The rim 26c encompasses the outer periphery of filter medium 25 and is spaced from the interior surface of housing 18 so as to form the aforementioned inlet passage 22.

Recessed center portion 26a is provided with a central opening in which is fixedly mounted a sleeve-like seal section 28. The function of the seal section 28 will be described more fully hereinafter.

The lower end piece 27 is formed of a suitable impervious material (e.g. metal or plastic). End piece 27 is provided with a central opening 27a through which an impervious pipe section 30 extends upwardly. The lower end 30a of section 30 is affixed to a collar which encompasses opening 27a. The upper end of pipe section 30 terminates within the sleeve-like seal section 28 and is affixed thereto. The outer periphery of end piece 27 is provided with an upstanding flange or rim 27b which is spaced from the housing interior surface to form inlet passage 22.

The second or lower filter unit 21 includes a filter medium 31 which, in the illustrated embodiment, is formed of a plurality of disc-like elements 32 arranged in stacked superposed relation, see FIG. 4. Each element may be of a porous felt-like material and is provided with a central opening 32a. The central openings of the elements 32 coact with one another to form an interior outlet passage 33 which is aligned with pipe section 30. The number of disc-like elements 32 comprising the medium 31 will depend upon the amount of lubricant to flow therethrough and the amount of filtration desired. Preferably the medium 31 has a filtering threshold of 2-5 μm. The outer periphery of each element may be provided with a plurality of facets 32b. In addition, certain of the facets are provided with outwardly extending spacer tabs 32c which engage the housing interior surface and effect centering of the medium 31 within the housing 18. The stack of elements 32 is supported by a lower end piece 34, see FIGS. 1 and 4. The end piece is of a rigid, impervious material similar to that utilized in forming end pieces 26, 27. The outer periphery of end piece 34 is provided with a flange or rim 34a. The flange extends upwardly and downwardly relative to the plane of the remainder of the end piece.

Disposed between end piece 34 and the closed end 18a of the housing 18 is a spiral spring 35. The enlarged end 35a of the spring engages the underside of end piece 34 delimited by the depending portion of flange 34a. The opposite end 35b of the spring engages the interior surface of the closed end 18a of the housing, see FIG. 1.

When the filter units 20, 21 are assembled in housing 18, the spring 35 is under compression by reason of a retainer element 36 which exerts a downward force on filter unit 20. The downward force is transmitted by unit 20 to filter unit 21 and thence to the spring 35. Element 36 is formed of a rigid durable material (e.g. steel or aluminum) and includes an outer rim portion 36a which is sized to fit within the housing open end 18b. The rim portion is suitably affixed to the housing interior surface. Extending inwardly and downwardly from the rim portion 36a is an apertured intermediate portion 36b. The apertures 36c formed in the intermediate portion 36b effect communication between the base member passage 19 and the inlet passage 22. The intermediate portion 36b of the retainer element terminates in a centrally disposed upstanding collar 36d. In the illustrated embodiment, collar 36d is internally threaded and threadably engages the external threads formed on the depending collar 15, the latter comprising a part of the base member 12. The juncture 36e between intermediate portion 36b and collar 36d exerts a compressive force on an annular second seal section 37, sometimes referred to hereinafter as a radial seal, which is disposed between the juncture 36e and the upper end piece 26 of the upper filter unit 20. Radial seal 37 automatically effects centering of seal 28.

A further seal section 38, sometimes referred to hereinafter as an axially compressive seal, is provided which is disposed at the housing open end 18b and intermediate the open end and the adjacent surface of the base member 12. As seen in FIG. 1 the base member surface is provided with an annular groove G in which the seal section 38 is disposed. All of the seal sections 28, 37 and 38 are carried by the head member 11. Furthermore, the location of the seal section 28 is such that as the pressure of the flowing lubricant increases in passage 24 the sealing engagement of seal 28 against the exterior of pipe section 30 and the exterior of protuberance 16 will increase. Thus, to attach the head member 11 to the base member 12 only requires a few turns of the head member so that the internal threads of the collar 36d of the retaining element 36 will threadably engage the external threads of the depending collar 15 of the base member 12. As collar 36d is threaded onto collar 15, the upper end of seal section 28 will slidably and sealingly engage the lower end of protuberance 16.

While filter unit 21 is shown in subtending relation with respect to filter unit 20, the invention is not limited thereto as the relative positions may be reversed, if desired. The lubricant flow through the filter unit 21, outlet passage 33 and pipe section 30, sometimes referred to as the by-pass circuit, is relatively small (e.g. 5-10% of the total lubricant flow within the engine) as compared to the lubricant flow through the circuit including filter unit 20 and outlet passage 24, the latter circuit is sometimes referred to as the full-flow circuit, see FIG. 2. The pressure drop within the full-flow circuit is relatively small as compared to that in the by-pass circuit. For example, if the lubricant pressure in the inlet passage 22 is approximately 50 psi, the downstream pressure—that is the pressure within outlet passage 24—would be approximately 49 psi. By contrast in the by-pass circuit the pressure drop through filter unit 21 would be approximately 8 psi. In addition to the filter medium 31, the flow in the bypass circuit is further restricted by means of an orifice of very small diameter (not shown) located downstream of the by-pass filter. The downstream orifice is the principal means of regulating the flow through the by-pass circuit. Thus, by reason of this pressure differential there will always be a reasonable amount of lubricant flow through the filter medium 31 for fine filtration performance. The geometry of seal section 28 and its relative location provides increased sealing effect with increased pressure differential.

Thus, an improved lubricant filter assembly has been disclosed which is of simple construction; the head member can be readily assembled and disassembled with respect to the base member with a minimum amount of manual effort; and the seal sections are carried on the head member and because of their geometry and relative location an effective sealing engagement is effective without substantial torque being applied to the head member.

I claim:

1. A lubricant filter assembly for an internal combustion engine having two lubricating circuits, one being a high flow circuit and the other being a by-pass circuit; said assembly comprising a base member mountable on the engine and having a first passage formation for communicating with the engine high flow circuit, and a second passage formation for communicating with the engine by-pass circuit, and an elongated head member removably mounted on said base member, said head member including an elongated housing open only at one end, at least first and second filter units disposed within said housing, said filter units being arranged in substantially endwise relation and having the outer peripheries thereof coacting with an interior surface of the housing to form a common inlet passage for a lubricant, one filter unit being provided with an interior first outlet passage in communication with the base member first passage formation whereby a minimal lubricant pressure drop occurs between the common inlet passage and said first outlet passage, the second filter unit being provided with an interior second outlet passage independent of the first outlet passage and in communication with the base member second passage formation whereby a substantially greater lubricant pressure drop occurs between the common inlet passage and said second outlet passage, an axially compressive first seal section in sealing engagement with a surface of the base member and the portion of the housing defining the open end thereof, a radial second seal section disposed within the housing and sealingly separating the common inlet passage from the first outlet passage, and a third seal section disposed within the housing and sealingly separating the first and second outlet passages, said third seal section having a sleeve-like configuration and being in encompassing and engaging relation with a protruding segment of said second passage formation and being responsive to the pressure of the lubricant flow in said first outlet passage whereby the greater the lubricant flow pressure the greater the seal effected by said third seal section with the second passage formation segment.

2. The filter assembly of claim 1 wherein the third seal section is slidable in an endwise direction relative to the base member protruding segment when the head member is being assembled on the base member.

3. The filter assembly of claim 1 wherein the first and second filter units are retained in abutting end to end relation within the housing by retaining means fixedly mounted within the housing open end, said retaining means including an element spanning the housing open end and having a rim portion affixed to the portion of the housing defining the open end thereof, an inner portion recessed relative to said rim portion and being removably connected to a depending portion of the base member encompassing in spaced relation the protruding segment of the second passage formation engaged by said third seal section, and an apertured intermediate portion interconnecting said rim and inner portions, the apertures of said intermediate portion defining entrances to the common inlet passage.

4. In an internal combustion engine having two lubricating circuits and a base member provided with a first passage formation communicating with one lubricating circuit and a second passage formation having an elongated protruding section segregated from the first passage formation and communicating with a second lubricating circuit; a head member removably mountable on the base member and comprising an elongated cylindrical housing open only at one end and having a longitudinal axis adapted to be aligned with the protruding section of the second passage formation; at least first and second filter units arranged in abutting end to end aligned relation within said head member, the outer peripheries of said filter units coacting with an interior surface of the housing to form a common lubricant inlet passage for each filter unit, the first filter unit being provided with an interior first outlet passage for communicating with the base member first passage formation, the second filter unit being provided with an interior second outlet passage segregated from said first filter unit interior first outlet passage for communicating with the base member second passage formation; and a sleeve-like seal section for slidably engaging the elongated protruding section of the base member when the head member is being assembled with the base member, said seal section being disposed intermediate said first and second outlet passages and responsive to the pressure of the lubricant flow through the first outlet passage to effect a sealing engagement with the elongated protruding section whereby the greater the flow pressure the greater sealing engagement therewith.

* * * * *